United States Patent
Podilchuk et al.

(10) Patent No.: US 10,290,084 B1
(45) Date of Patent: May 14, 2019

(54) CORRECTING IMAGE BLUR IN MEDICAL IMAGE

(71) Applicant: Sonavista, Inc, Warren, NJ (US)

(72) Inventors: Christine I. Podilchuk, Warren, NJ (US); Richard Mammone, Warren, NJ (US)

(73) Assignee: SONAVISTA, INC., Warren, NJ (US)

( * ) Notice: Subject to any disclaimer, the term of this patent is extended or adjusted under 35 U.S.C. 154(b) by 0 days.

(21) Appl. No.: 16/190,652

(22) Filed: Nov. 14, 2018

(51) Int. Cl.
*G06K 9/00* (2006.01)
*A61B 8/14* (2006.01)
*G06T 5/00* (2006.01)
*G06T 7/00* (2017.01)
*G06T 7/13* (2017.01)
*G06T 5/50* (2006.01)

(52) U.S. Cl.
CPC ............. *G06T 5/003* (2013.01); *G06T 5/002* (2013.01); *G06T 5/50* (2013.01); *G06T 7/0012* (2013.01); *G06T 7/13* (2017.01); *G06T 2207/10004* (2013.01); *G06T 2207/10132* (2013.01); *G06T 2207/20081* (2013.01); *G06T 2207/20084* (2013.01); *G06T 2207/20104* (2013.01); *G06T 2207/20192* (2013.01); *G06T 2207/20216* (2013.01); *G06T 2207/30004* (2013.01); *G06T 2207/30168* (2013.01)

(58) Field of Classification Search
USPC ........ 382/100, 103, 106–107, 128–134, 155, 382/162, 168, 173, 181, 190, 199, 209, 382/224, 232, 254, 255, 264, 274–276, 382/291, 305, 318; 600/200, 458; 348/208.11; 378/4, 21
See application file for complete search history.

(56) References Cited

U.S. PATENT DOCUMENTS

| | | | |
|---|---|---|---|
| 2015/0065803 A1* | 3/2015 | Douglas | A61B 1/00009 600/200 |
| 2015/0139515 A1* | 5/2015 | Smith | A61B 6/032 382/131 |
| 2016/0044245 A1* | 2/2016 | Tsubaki | H04N 5/23287 348/208.11 |
| 2017/0147892 A1* | 5/2017 | Ishii | G06K 9/00791 |
| 2018/0144214 A1* | 5/2018 | Hsieh | G06K 9/6265 |

OTHER PUBLICATIONS

Sun et al. J. Sun, W. Cao, Z. Xu, and J. Ponce. "Learning a convolutional neural network for non-uniform motion blur removal". In CVPR, pp. 769-777. IEEE, 2015.

(Continued)

*Primary Examiner* — Seyed H Azarian
(74) *Attorney, Agent, or Firm* — Gearhart Law, LLC

(57) ABSTRACT

A device to correct an image blur within a medical image is described. An image analysis application executed by the device receives the medical image from a medical image provider. Next, the image blur is detected within the medical image by analyzing the medical image. The medical image is subsequently processed with a deep learning model to correct the image blur. In response to the processing, a de-blurred medical image is generated. The de-blurred medical image is provided for a presentation or a continued analysis.

15 Claims, 5 Drawing Sheets

(56) References Cited

OTHER PUBLICATIONS

Nah et al. S. Nah, T. H. Kim, and K. M. Lee. "Deep multi-scale convolutional neural network for dynamic scene deblurring", pp. 3883-3891, 2017.
Whyte et al. O. Whyte, J. Sivic, A. Zisserman, and J. Ponce. "Nonuniform deblurring for shaken images. International Journal on Computer Vision", 98(2):168-186, 2012.
Xin Tao, et al. "Scale-recurrent Network for Deep Image Deblurring". CVPR pp. 8174-8182, 2018.

* cited by examiner

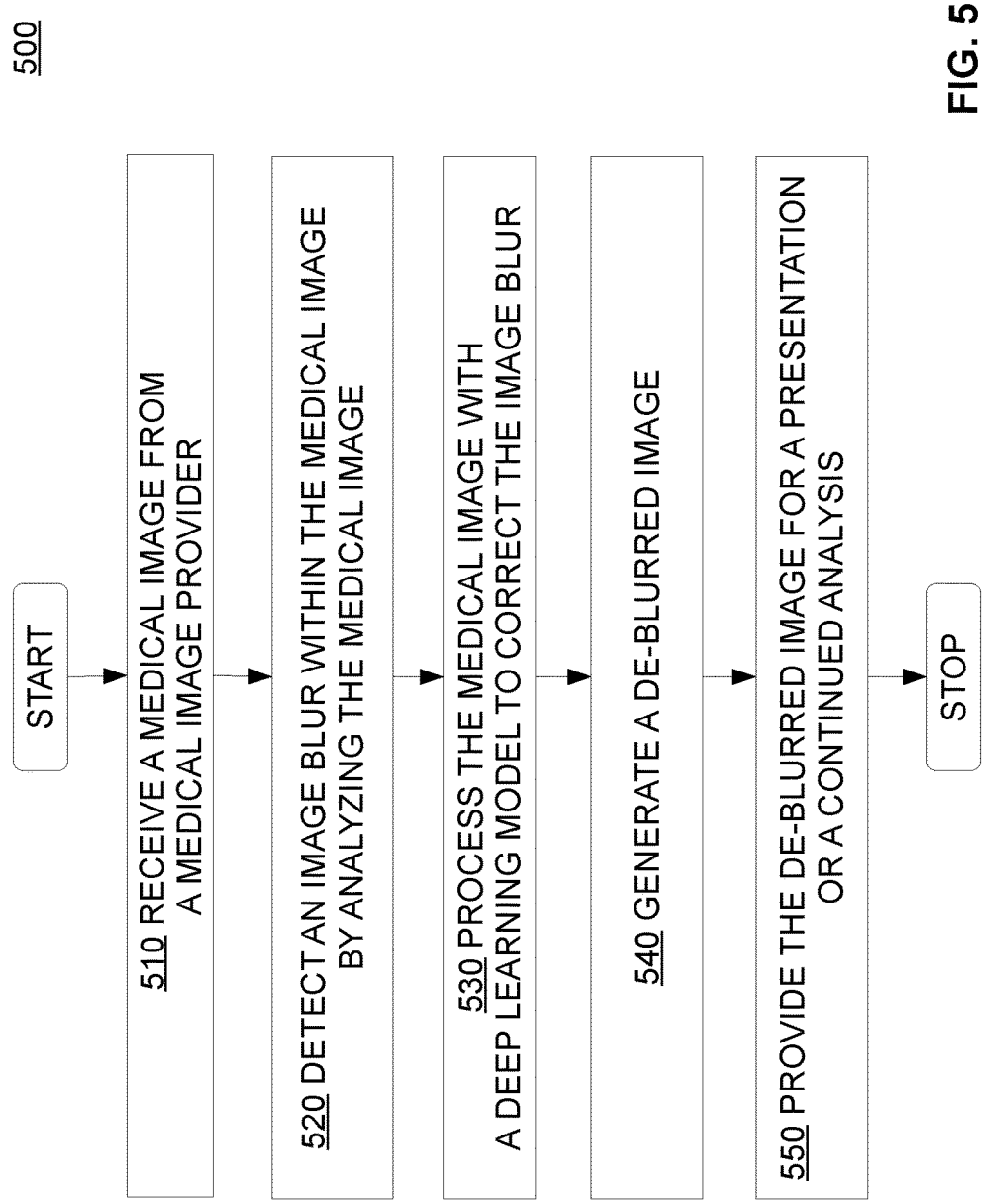

CORRECTING IMAGE BLUR IN MEDICAL IMAGE

CLAIM OF PRIORITY

This application is a non-provisional application and claims no priority to any patent or patent application.

FIELD OF THE EMBODIMENTS

The field of the embodiments relate to a device to correct an image blur within a medical image. The corrective mechanism may sharpen blurred edge(s) of an object of interest by processing the medical image with a deep learning model.

BACKGROUND OF THE EMBODIMENTS

Information exchanges have changed processes associated with work and personal environments. Automation and improvements in processes have expanded the scope of capabilities offered for personal and business data consumption. With the development of faster and smaller electronics, a variety of mobile devices have integrated into daily lives. A modern mobile device includes components to provide variety of services such as communication, display, imaging, voice, and/or data capture, among others. Abilities of the modern mobile device jump exponentially when networked to other resources that provide previously unimagined number of services associated with medical imaging.

Ultrasound and other medical imaging devices remove noise related issues during an imaging session by scanning a variety of images of a biological structure of a patient. The scanned images are combined with an averaging process that reduces and/or eliminates noise inherent in an imaging session. As an artifact of the averaging process blurring effects are introduced to the resulting medical image. The blurring effects may diminish chances of a correct diagnosis that relies on distinguishable edges associated with an object of interest within the medical image.

SUMMARY OF THE EMBODIMENTS

The present invention and its embodiments relate to a device to correct an image blur in a medical image. The device may be configured to receive the medical image from a medical image provider. The medical image provider may include a medical imaging device. The medical image may include an ultrasound scan of a biological structure (such as an organ) of a patient. Next, the image blur may be detected within the medical image by analyzing the medical image. The image blur may result from a process to reduce noise inherent in the medical imaging process by generating an averaged image of a variety medical ultrasound images (captured during an ultrasound session). Furthermore, the medical image may be processed with a deep learning model to correct the image blur. The deep learning model may be generated with a training input set of averaged images and an expected output set of de-blurred images corresponding to the averaged images. A de-blurred medical image may be generated in response to processing the medical image. In addition, the de-blurred medical image may be provided for a presentation or a continued analysis.

In another embodiment of the present invention, a mobile device for correcting an image blur in a medical ultrasound image is described. The mobile device may include a memory configured to store instructions associated with an image analysis application. A processor may be coupled to the memory. The processor may execute the instructions associated with the image analysis application. The image analysis application may include a neural network module. The neural network module may be configured to receive the medical ultrasound image from a medical image provider. Next, the image blur may be detected within the medical ultrasound image by analyzing the medical ultrasound image. The image blur may result from a noise reduced average of ultrasound session images of a biological structure of a patient. The medical ultrasound image may subsequently be processed with a deep learning model to correct the image blur. In response to the processing, a de-blurred medical ultrasound image may be generated. In addition, the de-blurred medical ultrasound image may be provided for a presentation or a continued analysis.

In yet another embodiment of the present invention, a method of correcting an image blur in a medical ultrasound image is described. The method includes receiving the medical ultrasound image from a medical image provider. Next, the image blur may be detected within the medical ultrasound image by analyzing the medical ultrasound image. The image blur may result from a noise reduced average of ultrasound session images of a biological structure of a patient. The medical ultrasound image may be processed with a deep learning model to correct the image blur. In response to the processing, a de-blurred medical ultrasound image may be generated. Furthermore, the de-blurred medical ultrasound image may be provided for a presentation or a continued analysis.

It is an object of the embodiments of the present invention to correct an image blur in a medical image (such as an ultrasound scan) with a neural network mechanism.

It is an object of the embodiments of the present invention to process a medical image with a deep learning model to detect the image blur.

It is an object of the embodiments of the present invention to process the medical image with the deep learning model to correct the image blur.

It is an object of the embodiments of the present invention to sharpen edges of an object of interest in the medical image to correct the image blur.

These and other features, aspects and advantages of the present invention will become better understood with reference to the following drawings, description and claims.

BRIEF DESCRIPTION OF THE DRAWINGS

FIG. 5 is a logic flow diagram illustrating a process for correcting an image blur in a medical image, according to an embodiment of the invention.

DESCRIPTION OF THE PREFERRED EMBODIMENTS

Figure 1:
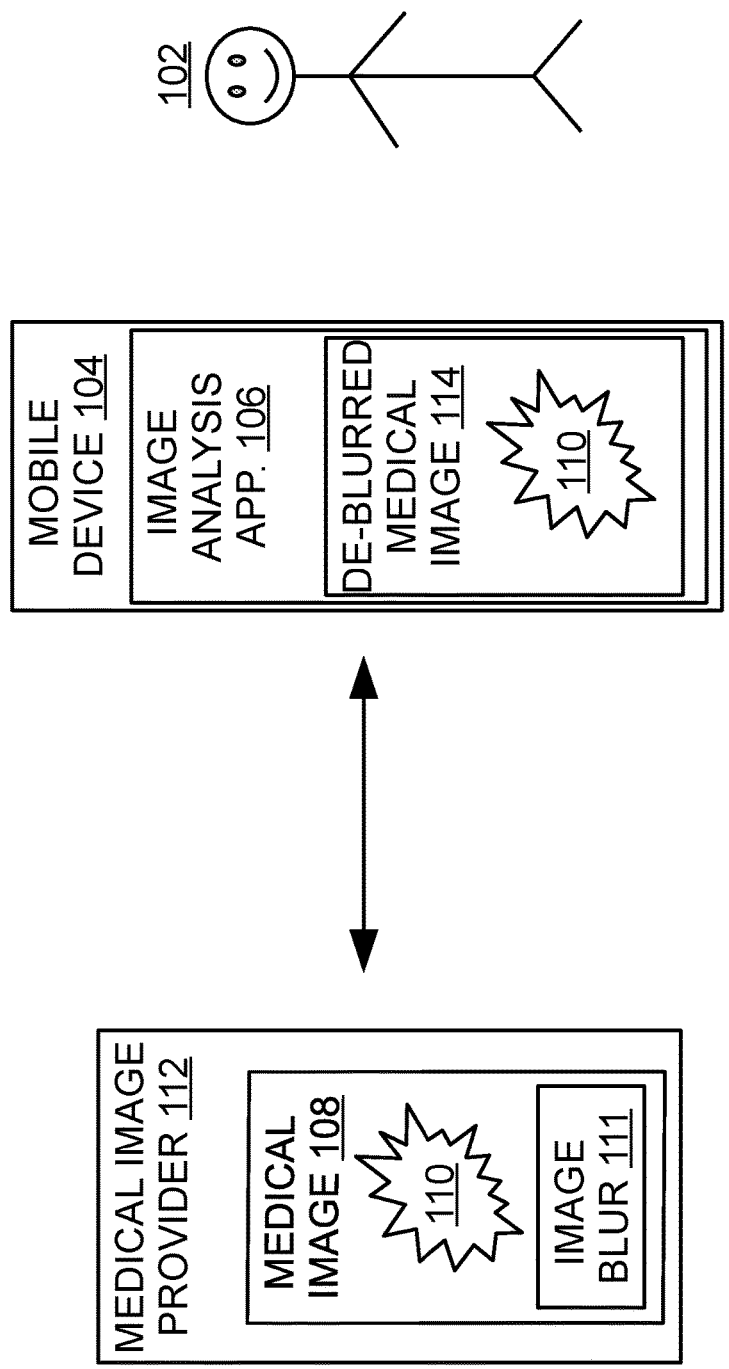
FIG. 1 shows a conceptual diagram illustrating examples of correcting an image blur in a medical image, according to an embodiment of the invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations may be made thereto.

FIG. 1 shows a conceptual diagram illustrating examples of correcting an image blur in a medical image. In an example scenario, a mobile device 104 may execute (or provide) an image analysis application 106. The mobile device 104 may include a physical computing device hosting and/or providing features associated with a client application (such as the image analysis application 106). The mobile device 104 may include and/or is part of a smart phone, a tablet based device, and/or a laptop computer, among others. The mobile device 104 may also be a node of a network. The network may also include other nodes such as the medical image provider 112, among others. The network may connect nodes with wired and wireless infrastructure.

The mobile device 104 may execute the image analysis application 106. The image analysis application 106 may receive a medical image 108 from a medical image provider 112. An example of the medical image 108 may include an ultrasound image (or scan). Other examples of the medical image 108 may include a x-ray image, a magnetic resonance imaging (MRI) scan, a computed tomography (CT) scan, and/or a positron emission tomography (PET) scan, among others. The medical image provider 112 may include a medical imaging device/system that captures, manages, and/or presents the medical image 108 to a user 102. The user 102 may include as a doctor, a nurse, a technician, a patient, and/or an administrator, among others. The user 102 may use the medical image 108 to diagnose an issue, a malignancy (cancer), and/or other illness associated with a patient.

The medical image 108 and a de-blurred medical image 114 may include an object of interest (OI) 110. The OI 110 may include a biological structure of a patient. For example, the OI 110 may include a malignant or a benign tumor. Alternatively, the OI 110 may represent another structure associated with an organ and/or other part of the patient.

The image analysis application 106 may next detect an image blur 111 within the medical image 108 by analyzing the medical image 108. The image blur 111 may result from an averaging process to combine multiple images captured during an imaging session (such as an ultrasound session) of a biological structure of a patient. The medical imaging device (conducting the imaging session) may combine the scanned images with an averaging process to generate the medical image 108. The averaging process may reduce noise inherent in the capture process associated with the imaging session. However, the averaging process may blur edge(s) of the biological structure of the patient within the medical image 108. Sharp edges may be critical to automated and/or manual diagnosis of an illness such as cancer. Blurred edges caused by the averaging process may hinder attempts at automated and/or manual diagnosis.

Next, the medical image 108 may be processed with a deep learning model to correct the image blur 111. The deep learning model may be generated using a training input set and an expected output set. The training input set may include averaged images (associated with medical imaging sessions) and expected de-blurred images corresponding to the averaged images.

In response to the processing of the medical image 108, a de-blurred medical image 114 may be generated. The de-blurred medical image 114 may include the OI 110 with sharpened edges. Subsequently, the de-blurred medical image 114 may be provided for a presentation to the user 102 or a continued analysis by a downstream analysis application/service.

Previous example(s) to correct an image blur in the medical image 108 are not provided in a limiting sense. Alternatively, the image analysis application 106 may perform operations associated with correcting the image blur in the medical image 108 as a desktop application, a workstation application, and/or a server application, among others. The image analysis application 106 may also be a client interface of a server based application.

The user 102 may interact with the image analysis application 106 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the mobile device 104, the image analysis application 106, embodiments are not limited to these components or system configurations and can be implemented with other system configuration employing fewer or additional components.

Figure 2:
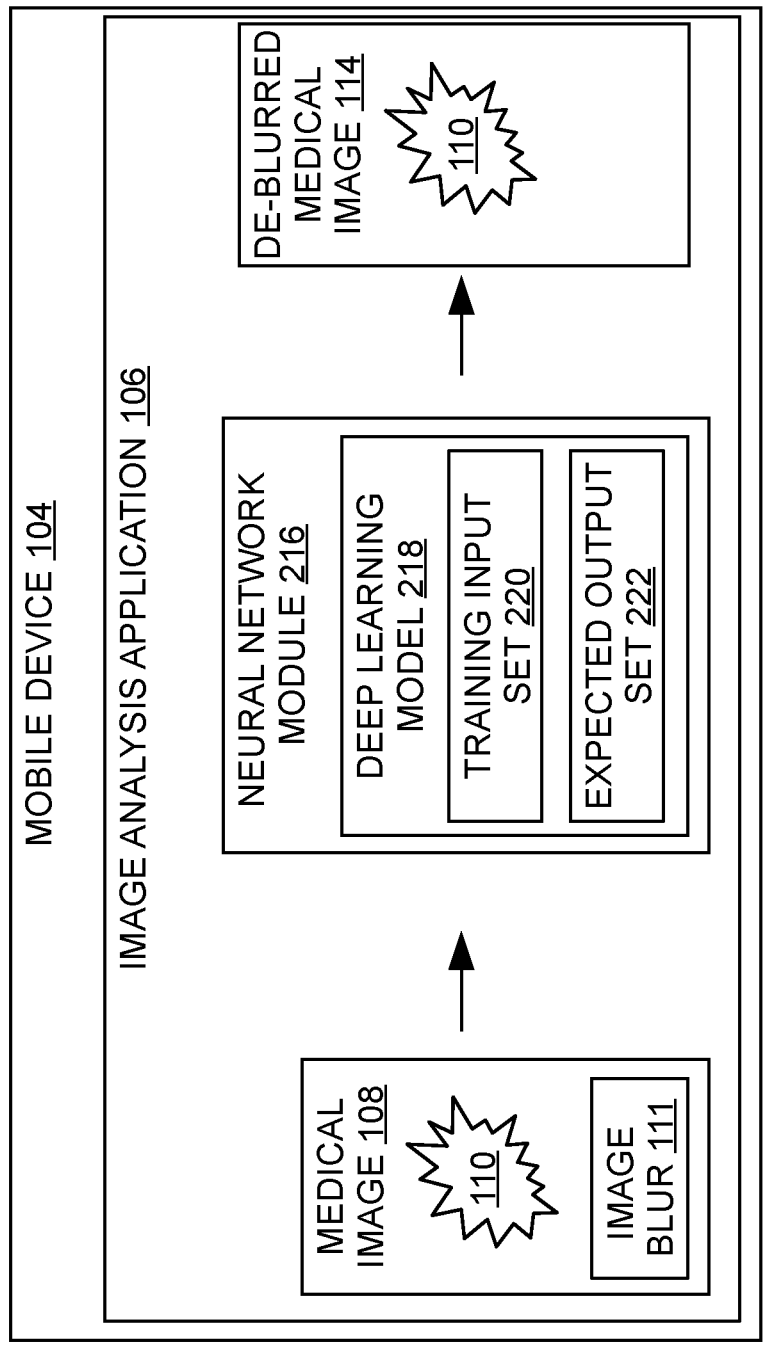
FIG. 2 shows a display diagram illustrating components of a neural network mechanism to correct an image blur in a medical image, according to an embodiment of the invention.

FIG. 2 shows a display diagram illustrating components of a neural network mechanism to correct an image blur 111 in the medical image 108. In an example scenario, the image analysis application 106 (executed by the mobile device 104) may process the medical image 108 with a neural network module 216. An example of the medical image 108 may be an ultrasound image (or scan). The medical image 108 may also include the OI 110 such as a biological structure of the patient. The medical imaging device (used to capture the medical image 108) may generate the medical image 108 with an image blur 111. The image blur 111 may soften edge(s) of the OI 110. Sharp edges associated with the OI 110 may be critical to manual or automated diagnosis. As such, the capture process of the medical imaging device may diminish a probability of correct diagnosis associated with the OI 110.

The capture process may record several images of the OI 110 and combine the images with an averaging process to generate the medical image 108. The averaging process may remove noise associated with the capture process but soften the edges of the OI 110. To enable a correct diagnosis associated with the OI 110, the image analysis application 106 may sharpen edges associated with the OI 110.

Next, the neural network module 216 of the image analysis application 106 may process the medical image 108. The neural network module 216 may process the medical image 108 with a deep learning model 218. The deep learning model 218 may be generated with a training input set 220 and an expected output set 222. In an example scenario, the image analysis application 106 may generate the deep learning model 218. Alternatively, the image analysis application 106 may retrieve the deep learning model 218 from an external service provider.

The training input set 220 may include averaged images of prior imaging sessions (from a variety of patients). Each of the averaged images may include a noise reduced average of several medical images (such as ultrasound images) captured during an imaging session (such as an ultrasound session). Edge(s) of OI(s) within the averaged images may be blurred as a result of the averaging process to reduce noise.

The expected output set 222 may include de-blurred images corresponding to the averaged images. Edge(s) of the OI(s) within each of the de-blurred images may be sharpened. The sharpening effect may be applied automatically and/or manually to the edge(s). The deep learning model 218 may be trained based on an analysis of the training input set 220 and the expected output set 222. The training process may form the deep learning model 218 based on how the sharpening effect is applied to the expected output set 222 to correct the softened edges of the OIs within the training input set 220.

In addition, the neural network module 216 may process the medical image 108 with the deep learning model 218 to remove the image blur 111. The image blur 111 may be removed by sharpening softened edge(s) of the OI 110. As a result of the processing of the medical image 108, the neural network module 216 may generate a de-blurred medical image 114. The de-blurred medical image 114 may include the OI with sharpened edge(s).

Figure 3:
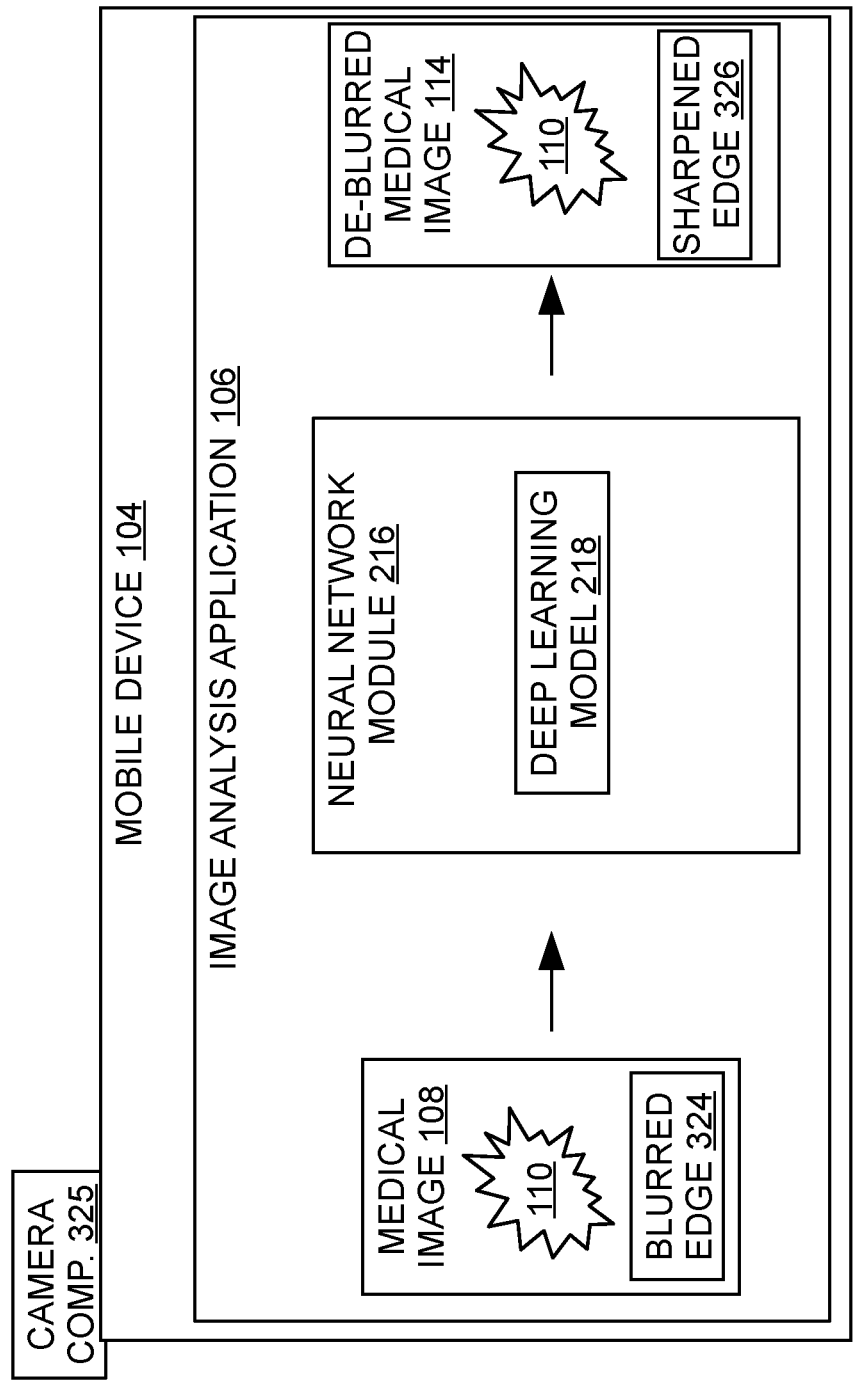
FIG. 3 shows another display diagram illustrating components of a neural network mechanism to correct an image blur in a medical image, according to an embodiment of the invention.

FIG. 3 shows another display diagram illustrating components of a neural network mechanism to correct the image blur in the medical image 108. The image analysis application 106 (executed by the mobile device 104) may process the medical image 108 that includes the OI 110. The medical image 108 may include the image blur. The image blur may result in the OI 110 having a blurred edge 324. The capture process (to record the medical image 108) may introduce the blurred edge 324 to the OI 110. The capture process may combine multiple images recorded during an imaging session to produce an averaged image (the medical image 108) that diminishes noise but softens the OI 110 causing the blurred edge 324.

The neural network module 216 may process the medical image 108 with the deep learning model 218 to identify and correct the blurred edge 324 of the OI 110. In response to processing the medical image 108, the neural network module 216 may produce the de-blurred medical image 114. The de-blurred medical image 114 may include the OI 110 with a sharpened edge 326 (among other sharpened edges). The sharpened edge 326 of the OI 110 may allow downstream diagnosis process (or a user) to correctly diagnose a malignancy, an issue and/or an illness associated with the OI 110.

The image analysis application 106 may receive the medical image 108 from a medical imaging device. Alternatively, the image analysis application 106 may receive the medical image 108 from a camera component 325 of the mobile device 104. The camera component 325 may record the medical image 108 as a copy of a scanned image displayed by a display device associated with the medical imaging device. The scanned image may represent an imaging session of a biological structure of a patient (recorded by the medical imagining device).

The medical image 108 may also include a three dimensional image (which may represent components of a biological structure of a patient in three dimensions). In another example scenario, the neural network module 216 may determine whether the medical image 108 includes a metadata. In response to a verification of the metadata, the neural network module 216 may analyze the medical image 108 (to detect the image blur) by evaluating the metadata. For example, the neural network module 216 may identify an annotation associated with the medical image 108 within the metadata. The annotation may designate an averaging process used to generate the medical image from scanned images of a scanning session of a biological structure of a patient. In response to detecting the annotation, the neural network module 216 may designate the medical image 108 as including the image blur.

In yet another example scenario, the image analysis application 106 may receive a selection of a region of interest (ROI) of the medical image 108 from a user. The neural network module 216 may focus an image blur detection process and analyze the ROI to identify the image blur within the ROI. Furthermore, the medical image 108 may be processed with the deep learning model 218 in a real-time or offline to remove the image blur and generate the de-blurred medical image 114 (with the OI 110 having the sharpened edge 326). Alternatively, the neural network module 216 may process the medical image 108 and subsequent image(s) of a time sequence based scanning session (of a biological structure of a patient) with the deep learning model 218 in a real-time or offline. The neural network module 216 may generate the de-blurred medical image 114 and de-blurred subsequent image(s) in response to processing of the medical image 108 and the subsequent image(s). Alternatively, the neural network module 216 may generate a de-blurred video stream or animation by processing the medical image 108 and the subsequent image(s) with the deep learning model 218.

The example scenarios and schemas in FIGS. 1 through 3 are shown with specific components, data types, and configurations. Embodiments are not limited to systems according to these example configurations. A device to correct an image blur in the medical image 108 may be implemented in configurations employing fewer or additional components in applications and user interfaces. Furthermore, the example schema and components shown in FIGS. 1 through 3 and their subcomponents may be implemented in a similar manner with other values using the principles described herein.

Figure 4:
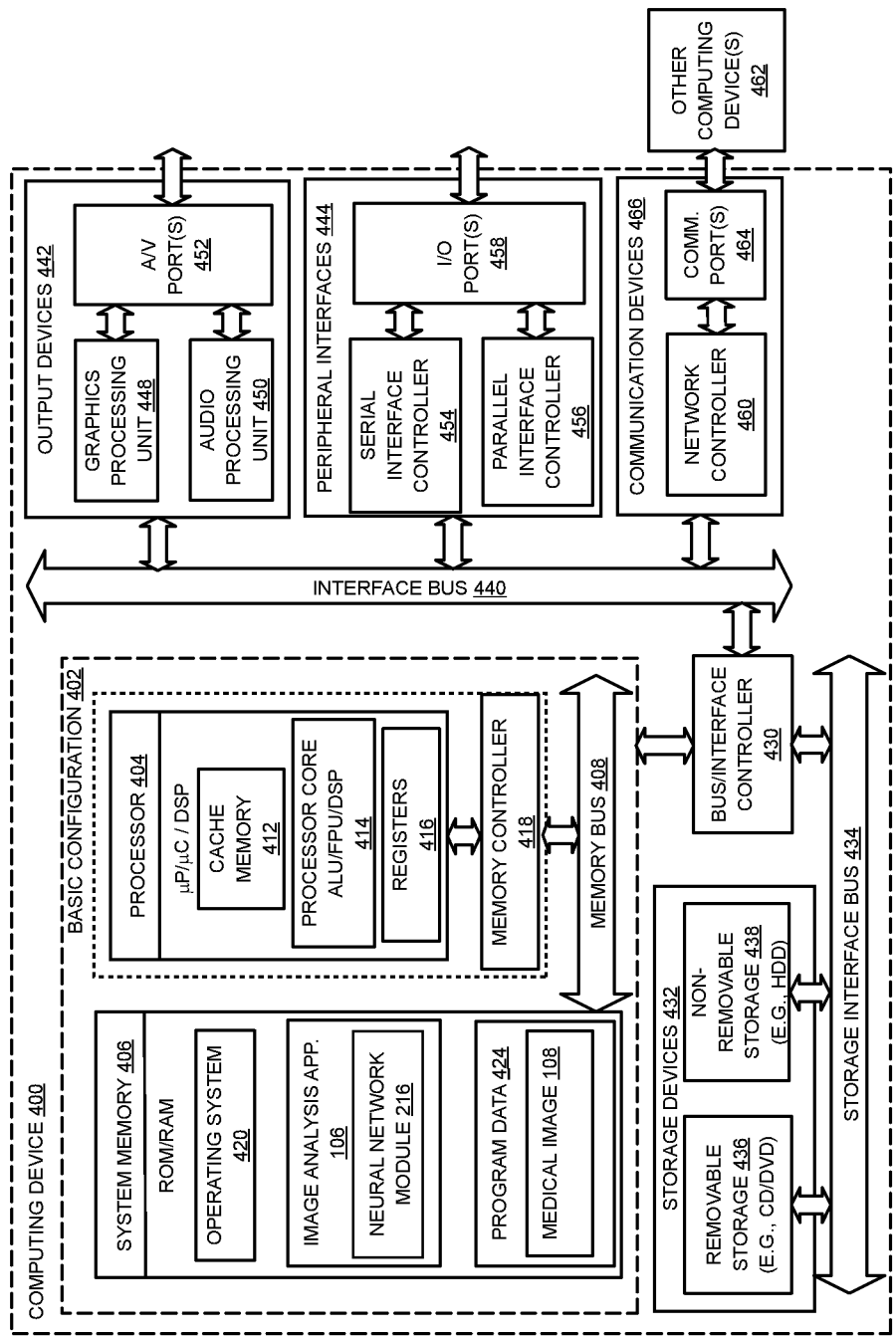
FIG. 4 is a block diagram of an example computing device, which may be used to correct an image blur in a medical image.

FIG. 4 is a block diagram of an example computing device, which may be used to correct an image blur in a medical image, according to embodiments.

For example, computing device 400 may be used as a server, desktop computer, portable computer, smart phone, special purpose computer, or similar device. In a basic configuration 402, the computing device 400 may include one or more processors 404 and a system memory 406. A memory bus 408 may be used for communication between the processor 404 and the system memory 406. The basic configuration 402 may be illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one more levels of caching, such as a level cache memory 412, one or more processor cores 414, and registers 416. The example processor cores 414 may (each) include an arithmetic logic unit (ALU), a floating-point unit (FPU), a digital signal processing core (DSP Core), a graphics processing unit (GPU), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.), or any combination thereof. The system memory 406 may include an operating system 420, the image analysis application 106, and a program data 424. The image analysis application 106 may include components such as the neural network module 216. The neural network module 216 may execute the instructions and processes associated with the image analysis application 106. In an example scenario, the neural network module 216 may receive a medical image from a medical image provider. Next, an image blur may be detected within the medical image by analyzing the medical image. The medical image may be processed with a deep learning model to correct the image blur. Subsequently, a de-blurred medical image may be generated. The de-blurred medical image may be provided for a presentation or a continued analysis.

Input to and output out of the image analysis application 106 may be captured and displayed through a display component that may be integrated to the computing device 400. The display component may include a display screen, and/or a display monitor, among others that may capture an input through a touch/gesture based component such as a digitizer. The program data 424 may also include, among other data, the medical image 108, or the like, as described herein. The medical image 108 may be processed with the deep learning model to correct softened edges of an OI introduced during the imaging process, among other things.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 466) to the basic configuration 402 via the bus/interface controller 430. Some of the example output devices 442 include a graphics processing unit 448 and an audio processing unit 450, which may be configured to communicate to various external devices such as a display or speakers via one or more A/V ports 452. One or more example peripheral interfaces 444 may include a serial interface controller 454 or a parallel interface controller 456, which may be configured to communicate with external devices such as input devices (for example, keyboard, mouse, pen, voice input device, touch input device, etc.) or other peripheral devices (for example, printer, scanner, etc.) via one or more I/O ports 458. An example of the communication device(s) 466 includes a network controller 460, which may be arranged to facilitate communications with one or more other computing devices 462 over a network communication link via one or more communication ports 464. The one or more other computing devices 462 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a specialized server, mainframe, or similar computer, which includes any of the above functions. The computing device 400 may also be implemented as a personal computer including both laptop computer and non-laptop computer configurations. Additionally, the computing device 400 may include specialized hardware such as an application-specific integrated circuit (ASIC), a field programmable gate array (FPGA), a programmable logic device (PLD), and/or a free form logic on an integrated circuit (IC), among others.

Example embodiments may also include methods to correct an image blur in a medical image. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

FIG. 5 is a logic flow diagram illustrating a process for correcting an image blur in a medical image. Process 500 may be implemented on a computing device, such as the computing device 400 or another system.

Process 500 begins with operation 510, where an image analysis application may receive a medical image from a medical image provider. The medical image may include an ultrasound image of a biological structure of a patient. At operation 520, the image blur within the medical image may be detected by analyzing the medical image. Next, at operation 530, the medical image may be processed with a deep learning model to correct the image blur.

Furthermore, at operation 540, a de-blurred medical image may be generated in response to processing the medical image. The de-blurred medical image may include sharpened edge(s) of an OI. At operation 550, the de-blurred medical image may be provided for a presentation or a continued analysis.

The operations included in process 500 is for illustration purposes. Correcting an image blur in a medical image may be implemented by similar processes with fewer or additional steps, as well as in different order of operations using the principles described herein. The operations described herein may be executed by one or more processors operated on one or more computing devices, one or more processor cores, specialized processing devices, and/or special purpose processors, among other examples.

A method of correcting an image blur within a medical image is also described. The method includes receiving the medical ultrasound image from a medical image provider. Next, the image blur may be detected within the medical ultrasound image by analyzing the medical ultrasound image. The image blur may result from a noise reduced average of several ultrasound session images of a biological structure of a patient. The medical ultrasound image may be processed with a deep learning model to correct the image blur. In response to the processing, a de-blurred medical ultrasound image may be generated. Furthermore, the de-blurred medical ultrasound image may be provided for a presentation or a continued analysis.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A device to correct an image blur in a medical image, wherein the device is configured to:
   receive the medical image from a medical image provider;
   detect the image blur within the medical image by analyzing the medical image;
   process the medical image with a deep learning model to correct the image blur, wherein
   a training input set of the deep learning model includes averaged images, wherein
   each of the averaged images includes a noise reduced average of medical scan images captured during an imaging session, and wherein
   one or more edges of an object of interest (OI) within each of the averaged images is blurred as a result of the noise reduced average of the medical scan images;
   generate a de-blurred medical image; and
   provide the de-blurred medical image for a presentation or a continued analysis.

2. The device of claim 1, wherein the medical image includes a medical ultrasound image.

3. The device of claim 1, wherein the medical image includes a three dimensional image.

4. The device of claim 1, wherein analyzing the medical image further includes a process to:
   evaluate a metadata of the medical image;
   identify an annotation associated with the medical image within the metadata, wherein the annotation designates an averaging process used to generate the medical image from a plurality of scanned images of a scanning session of a biological structure of a patient.

5. The device of claim 1, wherein detecting the image blur further includes a process to:
   receive a selection of a region of interest (ROI) of the medical image from a user; and
   analyze the ROI to identify the image blur within the ROI.

6. The device of claim 1, wherein the medical image is processed with the deep learning model in a real-time or offline.

7. The device of claim 1, wherein the medical image and a subsequent image of a time sequence based scanning session of a biological structure of a patient are processed with the deep learning model in a real-time or offline.

8. The device of claim 1, wherein an expected output set of the deep learning model includes de-blurred images corresponding to the averaged images.

9. The device of claim 8, wherein the one or more edges of the OI within each of the de-blurred images are sharpened.

10. The device of claim 1, wherein the image provider includes a medical imaging device.

11. The device of claim 10, wherein the medical imaging device is configured to:
    capture the medical image during a capture session to scan a biological structure of a patient.

12. The device of claim 1, wherein the image provider includes a camera component.

13. The device of claim 12, wherein the camera component is configured to:
    capture the medical image from a display device associated with a medical imaging device, wherein the display device is configured to display a scanned image of a biological structure of a patient.

14. A mobile device for correcting an image blur in a medical ultrasound image, the mobile device comprising:
    a memory configured to store instructions associated with an image analysis application,
    a processor coupled to the display component, the camera component, and the memory, the processor executing the instructions associated with the image analysis application, wherein the analysis application includes:
    a neural network module configured to:
    receive the medical ultrasound image from a medical image provider;
    detect the image blur within the medical ultrasound image by analyzing the medical ultrasound image, wherein the image blur results from a noise reduced average of ultrasound session images of a biological structure of a patient;
    process the medical ultrasound image with a deep learning model to correct the image blur, wherein correcting the image blur includes one or more operations to:
    identify one or more edges of an object of interest (OI) within the medical ultrasound image, wherein the one or more edges are blurred by the noise reduced average of the ultrasound session images, and
    sharpen the one or more edges of the OI based on the deep learning model;
    generate a de-blurred medical ultrasound image; and provide the de-blurred medical ultrasound image for a presentation or a continued analysis.

15. A method of correcting an image blur in a medical ultrasound image, the method comprising:

receiving the medical ultrasound image from a medical image provider;

detecting the image blur within the medical ultrasound image by analyzing the medical ultrasound image, wherein the image blur results from a noise reduced average of ultrasound session images of a biological structure of a patient;

processing the medical ultrasound image with a deep learning model to correct the image blur, wherein correcting the image blur includes:

identifying one or more edges of an object of interest (OI) within the medical ultrasound image, wherein the one or more edges are blurred by the noise reduced average of the ultrasound session images, and sharpening the one or more edges of the OI based on the deep learning model;

generating a de-blurred medical ultrasound image; and providing the de-blurred medical ultrasound image for a presentation or a continued analysis.

\* \* \* \* \*